United States Patent [19]

Olson et al.

[11] 4,322,455

[45] Mar. 30, 1982

[54] PROCESS FOR PRODUCING AN ULTRAVIOLET RADIATION STABILIZED POLYMERIC ARTICLE

[75] Inventors: Daniel R. Olson; Ta Y. Ching, both of Schenectady, N.Y.

[73] Assignee: General Electric Company, Pittsfield, Mass.

[21] Appl. No.: 187,507

[22] Filed: Sep. 15, 1980

[51] Int. Cl.$^3$ .................... B05D 7/02; B05D 3/02; B05D 7/24
[52] U.S. Cl. ..................................... 427/160; 427/316
[58] Field of Search ............................. 427/160, 316

[56] References Cited

U.S. PATENT DOCUMENTS

| | | | |
|---|---|---|---|
| 3,043,709 | 7/1962 | Amborski | 427/160 |
| 3,309,220 | 3/1967 | Osteen | 427/160 |
| 3,617,330 | 11/1971 | Pielstocker | 427/160 |
| 4,146,658 | 3/1979 | Humphrey | 427/160 |

Primary Examiner—James R. Hoffman
Attorney, Agent, or Firm—William F. Mufatti

[57] ABSTRACT

A process for producing an ultraviolet radiation stabilized polymeric, particularly polycarbonate, article comprising impregnation of the surface of said article with an ultraviolet radiation absorber by heating said polymeric article and applying onto the surface of said heated article an ultraviolet radiation stabilizing composition containing an ultraviolet radiation absorbing compound and a nonaggressive carrier.

9 Claims, No Drawings

PROCESS FOR PRODUCING AN ULTRAVIOLET RADIATION STABILIZED POLYMERIC ARTICLE

This invention relates to polycarbonate resin and more particularly to a process for producing shaped polycarbonate articles exhibiting superior resistance to ultraviolet radiation.

BACKGROUND OF THE INVENTION

The vast majority of all organic polymeric materials undergo some mode of degradation when exposed to the high energy photons of ultraviolet radiation. The degradation manifests itself depending on the polymeric material in yellowing, discoloration, embrittlement and other loss of physical properties. Polycarbonate resin is no exception and it is, therefore, an object of this invention to provide a method of producing a polycarbonate resin article which is highly resistant to ultraviolet radiation degradation.

The use of ultraviolet radiation absorbers with various resins, such as polyesters, polyolefins, vinyls, and polystyrene to provide protection against attack by ultraviolet radiation is known in the art. The ultraviolet radiation absorber functions by reason of its ability to screen out the damaging ultraviolet portion of light due to its very high absorptivity relative to that of the polymer. In order to qualify as a successful ultraviolet light absorber for a polymer, particularly for polycarbonate, there are several requirements which the absorber must fulfill. The absorber must have a high specific absorptivity in the range of wave lengths that are most deleterious to the polymer and that are present in the source of the exposure. The absorber must be compatible with the polymer such as polycarbonate and must not degrade the polymer with loss of properties and increase in color. The absorber must not significantly absorb in the visible region of the spectrum or a color will be imparted to the polymer to which it has been added. The absorber must also have a sufficiently low volatility to permit its continued residence in the polymer.

Several methods are known in the prior art utilizing these ultraviolet radiation absorbers to stabilize various polymers, including polycarbonate, against ultraviolet radiation. These methods include blending the ultraviolet radiation absorbers with the polymer prior to processing; incorporating the absorbers in surface laminating or coating materials which are applied onto the surface of the processed polymer; and impregnating the absorbers in the polymer surface. The surface impregnation techniques known in the prior art include (i) using aggressive solvents to swell or soften the polymer surface thereby allowing the absorber to diffuse into the softened surface of the polymer; (ii) melting the absorber and the polymer surface in order to diffuse the molten absorber into the molten polymer surface; and (iii) partitioning of the absorber between a polymeric surface and a relatively poor solvent for the absorber held at high temperatures whereby the absorber, which is more soluble in the polymer than in the solvent, diffuses into the polymer surface.

While each of these methods can be utilized to impart improved ultraviolet stability to a polymer system, each of them has certain disadvantages. Blending the absorber with the bulk polymer results in the absorber being distributed throughout the entire polymer system. This procedure is both uneconomical, as these absorbers are usually quite expensive, and not completely successful. Since most of the absorber resides in the polymer's interior instead of at the surface where it is most needed, much of the harmful ultraviolet radiation penetrates and deteriorates the surface of the polymer structure before reaching the majority of the interiorly distributed absorber. Furthermore, since the concentration of the absorber in the resin is limited by the degree of compatibility of the absorber with the polymer, using sufficiently high concentrations of absorber effective to provide surface protection generally tends to adversely affect the physical properties of the polymer. Incorporating the absorbers in surface laminating or coating materials suffers from the disadvantage of being difficult and expensive to use since an extra complicated processing step is required. Furthermore, difficulties are sometimes encountered in adhering the coating or laminating material to the surface of the polymer, or in maintaining continued adequate adhesion, especially after exposure to weathering. Even when the coating or laminating material adheres well, they often cannot be applied without forming unsightly streaks on the polymer surface. An additional drawback to this method is that often the physical properties of the polymer, such as impact strength, are adversely affected by these coating or laminating materials.

While, in principle, the surface impregnation techniques are the most desirable since the ultraviolet radiation absorbers are contained only in the surface regions of the polymer where they are needed, in practice the prior art surface impregnation techniques all suffer from certain disadvantages. Melting the polymer and the absorbers in order to diffuse the absorbers into the polymer surface suffers from the defect that the polymer, or at least its surface region, must be heated to the melting point. This may result in an uneven or wrinkled polymer surface being formed upon cooling and solidifying of the polymer. Furthermore, the physical properties of the polymer may sometimes be deleteriously affected by this melting of the polymer. In the aggressive solvent technique an ultraviolet radiation absorbing compound is dissolved in a solvent which is aggressive towards the polymer, such as polycarbonate. Typical aggressive solvents for polycarbonate include chlorinated hydrocarbons, esters, or aromatic hydrocarbons. When these solutions are applied onto the surface of a polycarbonate article the aggressive solvent functions as a softening or swelling agent for the polymer surface allowing the absorber to diffuse into the softened or swelled polymer surface regions. However, the aggressive nature of these solvents causes problems. Surface imperfections can occur during coating and prolonged contact between the polymer and the aggressive solvent can lead to etching, hazing and crazing of the polymer. Using ultraviolet radiation stabilizing solutions containing an ultraviolet radiation absorbing compound which is more soluble in the polymer than in the stabilizing solution rather sharply limits the number and type of ultraviolet radiation absorbing compounds which may be used. Also, a large volume of the stabilizing solution must be used. This requires the use of large amounts of ultraviolet radiation absorber which is a rather expensive proposition.

Thus, there is a need for an economical and effective method for protecting polymeric, particularly polycarbonate, articles from the degradation caused by ultraviolet radiation. The instant invention provides such a method.

DESCRIPTION OF THE INVENTION

In accordance with the present invention there is provided a method of producing an ultraviolet radiation resistant polycarbonate article comprising impregnating the surface region of the polycarbonate article with an ultraviolet radiation absorber by heating the polycarbonate article and applying onto said heated article an ultraviolet radiation stabilizing composition containing an ultraviolet radiation absorbing compound and a nonaggressive liquid carrier for said compound.

In accordance with the present invention an article comprised of polycarbonate resin is formed in a conventional manner, for example by injection molding, extrusion, cold forming, vacuum forming, blow molding, compression molding, transfer molding, and the like. The article may be in any shape and need not be a finished article of commerce, that is, it could be sheet material or film which would be cut or sized or mechanically shaped into a finished article. Therefore, as used herein, it will be understood that the term "article" refers to any shape or form of polycarbonate resin whether finished or stock material.

The aromatic carbonate polymer used in the practice of the instant invention has recurring structural units of the formula

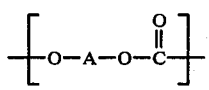

where A is a divalent aromatic radical of the dihydric phenol employed in the polymer producing reaction. These polycarbonate resins are high molecular weight aromatic carbonate polymers which may be prepared by reacting a dihydric phenol with a carbonate precursor such as phosgene, a haloformate or a carbonate ester.

The aromatic carbonate polymers of this invention may be prepared by methods well known in the art and described in U.S. Pat. Nos. 3,161,615; 3,220,973; 3,312,659; 3,312,660; 3,313,777; 3,666,614; and 3,989,672 all of which are incorporated herein by reference.

Also included herein are branched polycarbonates wherein a polyfunctional aromatic compound is reacted with the dihydric phenol and the carbonate precursor to provide a thermoplastic randomly branched polycarbonate wherein the recurring units of formula I contain branching groups.

The preferred polycarbonate resin is one which may be derived from the reaction of bisphenol-A with phosgene. These preferred polycarbonates have from about 10 to about 400 recurring structural units of the formula

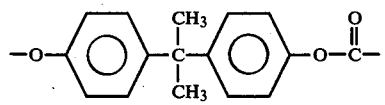

The polycarbonate should preferably have an intrinsic viscosity between 0.3 and 1.0, more preferably from 0.4 to 0.65 as measured at 25 degrees C. in methylene chloride.

To the surface of this polycarbonate article, which has been heated, is applied an ultraviolet radiation stabilizing composition which contains at least one ultraviolet radiation absorbing compound and at least one nonaggressive liquid carrier for said absorbers. By nonaggressive is meant that the liquid carrier is nonaggressive towards the polycarbonate, i.e., it does not attack and deleteriously affect the resin.

The ultraviolet radiation stabilizing composition of the instant invention may be in the form of a solution of the ultraviolet radiation absorber dissolved in the nonaggressive liquid carrier, a suspension or dispersion of the absorber suspended or dispersed in the liquid carrier, or part solution and part suspension or dispersion of the absorber in the carrier. Whether the stabilizing composition is in the form of a solution, a suspension or dispersion, or both a solution and a dispersion or suspension depends in part on the solubility of the particular absorber in the particular carrier with which it is combined. If the absorber is very soluble in the carrier then the stabilizing composition will be in the form of a solution. If the absorber is not very soluble in the carrier then the stabilizing composition will be in the form of a suspension or dispersion of the absorber in the carrier. If the absorber has medium solubility in the carrier then the stabilizing composition will have the character of both a solution and a suspension or dispersion with part of the amount of the absorber present being dissolved in the carrier and the remainder of the undissolved absorber being suspended or dispersed in the carrier. Also affecting the character of the stabilizing composition is the amount of the absorber present in the composition. Thus, if a small amount of an absorber having medium solubility in a particular carrier is used the stabilizing composition will tend to be in the form of a solution. If, however, a larger amount of the same absorber is used with the same carrier then the stabilizing composition will tend to be in the form of both a solution and a dispersion or suspension. Preferably the stabilizing composition should be in the form of a solution in order to achieve optimum results.

The stabilizing composition contains a stabilizing amount of the ultraviolet radiation stabilizing or absorbing compound. By stabilizing amount is meant an amount of absorber effective to stabilize the polycarbonate article against degradation by ultraviolet radiation after the polycarbonate article has been treated with the stabilizing composition. Generally, a stabilizing amount of the ultraviolet radiation absorber is present when the stabilizing composition contains from about 0.01 to about 15 weight percent of the ultraviolet radiation absorber, preferably from about 0.1 to about 10 weight percent of the ultraviolet radiation absorber, and more preferably from about 1 to about 8 weight percent of the absorber. The stabilizing composition may contain only one ultraviolet radiation absorbing compound or a combination of two or more ultraviolet radiation absorbing compounds. If two or more ultraviolet radiation absorbing compounds are present in the stabilizing composition their combined weight percentages should be from about 0.01 to about 15 weight percent of the stabilizing composition.

The ultraviolet radiation absorbers employed in the practice of this invention can be any of the known ultraviolet radiation absorbent compounds which function by reason of their ability to screen out the damaging ultraviolet portion of light due to their very high absorptivity in this region of the spectrum. These compounds include the benzophenones and benzophenone derivatives, benzotriazoles and benzotriazole derivatives, benzoate esters, phenyl salicylates, derivatives of crotonic acid, malonic acid esters, and cyanoacrylates.

Ultraviolet radiation absorbers which fall into the benzophenone and benzotriazole derivatives include those compounds disclosed in U.S. Pat. Nos. 3,309,220; 3,049,443; and 2,976,259 all of which are incorporated herein by reference. Some non-limiting examples of these compounds include:

2,2'-dihydroxybenzophenone;
2,2',4,4'-tetrahydroxybenzophenone;
2,2'-dihydroxy-4,4'-dimethoxybenzophenone;
2,2'-dihydroxy-4,4'-diethoxybenzophenone;
2,2'-dihydroxy-4,4'-dipropoxybenzophenone;
2,2'-dihydroxy-4,4'-dibutoxybenzophenone;
2,2'-dihydroxy-4-methoxy-4'-ethoxybenzophenone;
2,2'-dihydroxy-4-methoxy-4'-propoxybenzophenone;
2,2'-dihydroxy-4-methoxy-4'-butoxybenzophenone;
2,2'-dihydroxy-4-ethoxy-4'-propoxybenzophenone;
2,2'-dihydroxy-4-ethoxy-4'-butoxybenzophenone;
2,3'-dihydroxy-4,4'-dimethoxybenzophenone;
2,3'-dihydroxy-4-methoxy-4'-butoxybenzophenone;
2-hydroxy-4,4',5'-trimethoxybenzophenone;
2-hydroxy-4,4',6'-tributoxybenzophenone;
2-hydroxy-4-butoxy-4',5'-dimethoxybenzophenone;
2-hydroxy-4-ethoxy-2',4'-dibutylbenzophenone;
2-hydroxy-4-propoxy-4',6'-dichlorobenzophenone;
2-hydroxy-4-propoxy-4',6'-dibromobenzophenone;
2,4-dihydroxybenzophenone;
2-hydroxy-4-methoxybenzophenone;
2-hydroxy-4-ethoxybenzophenone;
2-hydroxy-4-propoxybenzophenone;
2-hydroxy-4-butoxybenzophenone;
2-hydroxy-4-methoxy-4'-methylbenzophenone;
2-hydroxy-4-methoxy-4'-ethylbenzophenone;
2-hydroxy-4-methoxy-4'-propylbenzophenone;
2-hydroxy-4-methoxy-4'-butylbenzophenone;
2-hydroxy-4-methoxy-4'-tertiary butylbenzophenone;
2-hydroxy-4-methoxy-4'-chlorobenzophenone;
2-hydroxy-4-methoxy-2'-chlorobenzophenone;
2-hydroxy-4-methoxy-4'-bromobenzophenone;
2-hydroxy-4,4'-dimethoxybenzophenone;
2-hydroxy-4,4'-dimethoxy-3-methylbenzophenone;
2-hydroxy-4,4'-dimethoxy-2'-ethylbenzophenone;
2-hydroxy-4,4',5'-trimethoxybenzophenone;
2-hydroxy-4-ethoxy-4'-methylbenzophenone;
2-hydroxy-4-ethoxy-4'-ethylbenzophenone;
2-hydroxy-4-ethoxy-4'-propylbenzophenone;
2-hydroxy-4-ethoxy-4'-butylbenzophenone;
2-hydroxy-4-ethoxy-4'-methoxybenzophenone;
2-hydroxy-4,4'-diethoxybenzophenone;
2-hydroxy-4-ethoxy-4'-propoxybenzophenone;
2-hydroxy-4-ethoxy-4'-butoxybenzophenone;
2-hydroxy-4-ethoxy-4'-chlorobenzophenone;
2-hydroxy-4-ethoxy-4'-bromobenzophenone;
2-(2'-hydroxy-5'-methylphenyl)-benzotriazole;
2-(2'-hydroxy-5'-tert-butylphenyl)benzotriazole;
2-(2'-hydroxy-3'-methyl-5'-tert-butylphenyl)-benzotriazole;
2-(2'-hydroxy-5'-cyclohexylphenyl)-benzotriazole;
2-(2'-hydroxy-3',5'-dimethylphenyl)-benzotriazole;
2-(2'-hydroxy-5'-tert-butylphenyl)-5-chloro-benzotriazole: and
2-(2'-hydroxy-3'-di-tert-butylphenyl)-benzotriazole.

Two non-limiting examples of derivatives of crotonic acid which function as ultraviolet radiation absorbers are alpha-cyano-beta-(p-methoxyphenyl)-crotonic acid methyl ester and alpha-cyano-beta-N-(2-methylindolinyl)-crotonic acid methyl ester. The benzoate ester ultraviolet radiation absorbers include the $C_8$–$C_{20}$ alkyl and aryl benzoates, alkyl and aryl hydroxybenzoates, alkaryl and aralkyl benzoates, and alkaryl and aralkyl hydroxybenzoates.

The malonic acid esters which are effective ultraviolet radiation absorbers include the benzylidene malonates. These benzylidene malonates are represented by the general formula

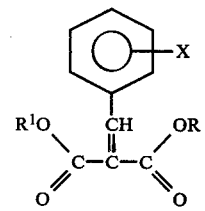

III.

wherein X is selected from hydrogen, hydroxyl, halogen, alkyl, preferably $C_1$–$C_{10}$ alkyl, and alkoxy, preferably $C_1$–$C_{10}$ alkoxy, radicals; and R and $R^1$ are independently selected from alkyl radicals, preferably alkyl radicals containing from 1 to about 10 carbon atoms, substituted alkyl radicals, preferably those containing from 1 to about 10 carbon atoms and hydroxyl or halogen substituents, aryl radicals, preferably the phenyl radical, alkaryl radicals, preferably alkaryl radicals containing from 7 to about 12 carbon atoms, aralkyl radicals, preferably aralkyl radicals containing from 7 to about 12 carbon atoms, and substituted aryl radicals, preferably those phenyl radicals containing hydroxyl or halogen substituents. Preferred benzylidene malonates represented by formula III are those wherein X represents an alkoxy group and R and $R^1$ are independently selected from alkyl radicals. Examples of such benzylidene malonates include diethyl paramethoxybenzylidene malonate and dimethyl paramethoxybenzylidene malonate.

Among the cyano-acrylates which are useful ultraviolet radiation absorbers are those cyano acrylates represented by the general formula

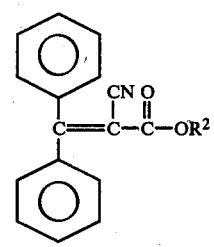

IV.

wherein $R^2$ is alkyl or hydroxyalkyl. These compounds are disclosed in U.S. Pat. No. 4,129,667 which is incorporated herein by reference.

The preferred ultraviolet radiation absorbing compounds, for the purposes of the present invention, are benzophenone and the benzophenone derivatives, benzotriazole and the benzotriazole derivatives, the benzylidene malonates, and the cyano-acrylates.

The stabilizing composition contains at least one nonaggressive liquid carrier for the ultraviolet radiation absorber. This liquid carrier is nonaggressive towards the polycarbonate, i.e., it does not attack the polycarbonate and does not cause the polycarbonate to swell or soften. The stabilizing composition can contain only one liquid carrier or it may contain two or more of the liquid carriers. If two or more of the liquid carriers are present in the stabilizing composition they must be miscible with each other. The preferred nonaggressive liquid carriers for the ultraviolet absorber include hydroxy ethers, alcohols, alcohol-water mixtures, liquid aliphatic hydrocarbons, liquid cycloaliphatic hydrocarbons, and chlorofluorocarbons such as those marketed by the E. I. duPont Company under the tradename Freon, e.g., dichlorodifluoromethane, trichloromonofluoromethane, and the like. Generally it is preferred that these liquid carriers be relatively volatile, i.e., that they volatilize at or below about 130° C.

The preferred alcohols are the aliphatic alcohols with the alkanols, particularly the $C_1$-$C_6$ alkanols, being preferred. Some nonlimiting examples of these $C_1$-$C_6$ alkanols include methanol, ethanol, propanol, isopropanol, tertiary butanol, and the like.

The preferred liquid aliphatic and cycloaliphatic hydrocarbons are the liquid saturated aliphatic and cycloaliphatic hydrocarbons containing from 5 to about 20 carbon atoms. Some nonlimiting examples of these hydrocarbons include pentane, hexane, octane, nonane, decane, undecane, the various positional isomers of the foregoing, cyclohexane, cyclopentane, cyclooctane, and the like.

The hydroxy-ethers which are useful as carriers in the stabilizing composition are compounds represented by the formula $$R^3-O-R^4-OH \qquad V.$$

wherein $R^3$ is an alkyl or an alkoxy alkyl radical containing from 1 to about 6 carbon atoms, and $R^4$ is a divalent saturated aliphatic hydrocarbon radical containing from 1 to about 6 carbons.

In the practice of the process of the instant invention a stabilizing composition containing the ultraviolet radiation absorber and the nonaggressive liquid carrier therefore is applied onto the surface of a preheated polycarbonate article by any of several known methods such as spraying, flow coating, brushing, and the like. The stabilizing composition is kept in contact with the preheated polycarbonate article for a period of time sufficient for the ultraviolet radiation absorber to effectively impregnate the surface layers of the polycarbonate article, this is for the ultraviolet radiation absorber to diffuse throughout the surface layers of the polycarbonate article in concentrations sufficient to provide protection against the deleterious effects of ultraviolet radiation. Since the stabilizing composition is nonaggressive towards the polycarbonate there is no upper time limit that the composition can remain in contact with the polycarbonate. Rather, the upper time limit is governed by such secondary considerations as speed of processing of the polycarbonate article, rate of cooling of the polycarbonate—if the polycarbonate cools below the critical temperature no more ultraviolet radiation absorber will diffuse into the polycarbonate—, rate of evaporation of the liquid carrier, and the like. The minimum period of time that the stabilizing composition is kept in contact with the polycarbonate article is the period of time which is sufficient for the ultraviolet radiation absorber to impregnate the surface layers of the polycarbonate in concentrations effective to protect the polycarbonate against degradation by ultraviolet radiation. This minimum period generally depends to a certain degree upon the particular ultraviolet radiation absorber present in the stabilizing composition, the particular liquid carrier present in the stabilizing composition, and the temperature to which the polycarbonate article is preheated. Generally, the stabilizing composition is kept in contact with the polycarbonate article from about 5 seconds to about 30 minutes, and preferably from about 30 seconds to about 15 minutes.

It is critical to the practice of the present process that the polycarbonate article be at a temperature sufficiently high when the stabilizing composition is contacted therewith for the ultraviolet radiation absorber to impregnate the surface layers thereof in concentrations effective to provide protection against degradation of the polycarbonate by ultraviolet radiation. If the polycarbonate is not at a temperature effective for the impregnation of the absorber into the polycarbonate surface layers when the stabilizing composition is applied onto the polycarbonate the ultraviolet absorber will not diffuse into or impregnate the surface layers of the polycarbonate and, consequently, the polycarbonate will not be protected against degradation by ultraviolet radiation. Generally, the minimum temperature at which impregnation of the polycarbonate article by the ultraviolet radiation absorber takes place is about 65° C. Preferably the polycarbonate should be at about at least 75° C. as at this temperature and above the ultraviolet radiation absorber generally diffuses rapidly and in large amounts into the surface layers of the polycarbonate resin article. The maximum temperature of the polycarbonate during contact with the stabilizing composition is governed by the fact that the temperature of the polycarbonate resin be not sufficiently high so as to deleteriously affect the physical properties of the polycarbonate resin. Thus the upper temperature limit is below about 150° C. which is the glass transition temperature of the polycarbonate resin. Preferably it should be below about 135° C., the temperature at which bubbles and other imperfections begin to appear in the polycarbonate resin.

Thus in the practice of the instant process the polycarbonate should be at a temperature between about 65 and about 149 degrees C. during contact with the stabilizing composition. For optimum results and optimum operating conditions the polycarbonate article should preferably be at a temperature between about 75 and about 135 degrees C. The polycarbonate article is preheated to this temperature before the stabilizing composition is contacted therewith. There is no active heating of the polycarbonate article during the period when the stabilizing composition is in contact with the surface thereof. The stabilizing composition is not heated but is at room temperature at the time of application onto the polycarbonate. An example of the application of the instant method is the application of the stabilizing composition onto the surface of a polycarbonate article coming out of an extruder.

After the stabilizing composition has been in contact with the preheated polycarbonate article for a period of time sufficient for the ultraviolet radiation absorber to diffuse into the surface areas of the polycarbonate in concentrations effective to stabilize the polycarbonate against degradation by ultraviolet radiation the polycarbonate article is washed, for example with isopropanol, to remove any residue of the stabilizing composition from the surface of the polycarbonate article. This washing of the surface of the polycarbonate article is an optional procedure.

It is to be understood that the polycarbonate resin used in the practice of the present invention may contain various known additives such as plasticizers, fillers, flame retardants and the like.

DESCRIPTION OF THE PREFERRED EMBODIMENT

In order to more fully and clearly illustrate the present invention, the following specific examples are presented. It is intended that the examples be considered as illustrative rather than limiting the invention disclosed and claimed herein. In the examples all parts and percentages are on a weight basis unless otherwise specified.

EXAMPLE 1

A 10 mil thick film of polycarbonate resin was taped to a ¼ inch thick panel of polycarbonate (to act as a heat body simulating extrusion line conditions for ¼ inch thick polycarbonate panels), heated to 125 degrees C., and flow coated with a solution of 5% 2,2',4,4'-tetrahydroxybenzophenone in 2-butoxyethanol. After cooling, the film was vigorously washed with isopropanol. This treatment did not visibly alter the optical quality of the film. The treated film was placed in the sample beam of a Perkin-Elmer Model Coleman 575 Spectrophotometer and an untreated film was placed in the reference beam. The absorbance of the treated film was greater than 2 in the 290-350 nm. Using the relationship $A = \log I_0/I$ where A is the absorbance, $I_0$ is the intensity of incident light, and I is the intensity of transmitted light, it was determined that an absorbance greater than 2 corresponds to absorption of more than 99% of the incident light by the treated film at λ maximum.

EXAMPLE 2

The procedure of Example 1 was substantially repeated except that the stabilizing composition contained 5% of Uvinul N-539 (a cyanoacrylate ultraviolet radiation absorber marketed by GAF Corp. and represented by general formula IV wherein $R^2$ is a $C_8H_{17}$ radical). The absorbance of the treated film was found to be 1.82, which corresponds to absorption of 98% of the incident ultraviolet light by the treated film.

EXAMPLE 3

The procedure of Example 1 was substantially repeated except that the stabilizing composition contained 5% of Cyasorb UV-1988 (a benzylidene malonate ultraviolet radiation absorber marketed by American Cyanimid Co. and represented by general formula III wherein X is the $OCH_3$ radical and R and $R^1$ are methyl radicals). The absorbance at λ max. of the treated film was found to be greater than 3, which corresponds to absorption at λ max. of more than 99% of the incident ultraviolet light by the treated film.

EXAMPLE 4

The procedure of Example 1 was substantially repeated except that the stabilizing composition contained 5% of Uvinul N-35 (a cyanoacrylate ultraviolet radiation absorber marketed by GAF Corp. and represented by general formula IV wherein $R^2$ is the ethyl radical). The absorbance of the treated film was found to be 2.5, which corresponds to absorption of more than 99% of the incident ultraviolet light by the treated film.

EXAMPLE 5

The procedure of Example 1 was substantially repeated except that the stabilizing composition contained 5% of 2-hydroxy-4-dodecyloxybenzophenone. The absorbance of the treated film was found to be 1.3, which corresponds to absorption of 95% of the incident ultraviolet light by the treated film.

EXAMPLE 6

The procedure of Example 1 was substantially repeated except that the stabilizing composition contained 5% of Cyasorb 5411 (a derivative of benzotriazole marketed by American Cyanimid Co.). The absorbance of the treated film was found to be 2.2, which corresponds to absorption of more than 99% of the incident ultraviolet light by the treated film.

EXAMPLE 7

A 10 mil thick polycarbonate film was taped to a ¼ inch thick panel of polycarbonate, heated to 75 degrees C., and flow coated with a solution of 3% Cyasorb uv-1988 in butoxyethanol. After cooling the film was washed with isopropanol. Treatment did not visibly alter the optical quality of the film. The treated film was placed in the sample beam of a Perkin-Elmer Model Coleman 575 Spectrophotometer and an untreated film was placed in the reference beam. The absorbance was 1.7 in the 290-350 nm. range. This absorbance corresponds to absorption of 97% of the incident ultraviolet light by the treated film.

EXAMPLE 8

This Example illustrates a method falling outside the scope of the present invention. This method, in which the polycarbonate is not heated before application of the stabilizing composition, is not effective in providing protection to polycarbonate resins against degradation by ultraviolet radiation. A 10 mil thick film of polycarbonate was flow coated with a solution of 3% Cyasorb uv-1988 in butoxyethanol. After standing at room temperature for 18 hours the film was washed with isopropanol. The absorbance of the film was obtained according to the procedure described in Example 1. The absorbance of this film was found to be 0 indicating that no ultraviolet radiation absorber had diffused into the polycarbonate film.

EXAMPLE 9

A treated film produced substantially in accordance with the procedure of Example 7 and an untreated film were placed 10 inches below two General Electric Company RS-sunlamps on a rotating table. After 4 days, the untreated film was yellow while the treated film was colorless.

As can be seen from the foregoing Examples the present method is effective in surface impregnating a polycarbonate resin with an ultraviolet radiation absorbing compound while a similar method, which differs from the instant method only in the omission of preheating the polycarbonate, is not effective in impregnating the surface of polycarbonate with the absorber.

The success of the instant process in providing protection for polycarbonate resins against degradation by ultraviolet radiation is surprising and rather unexpected. Those skilled in the art could have expected in view of the teachings of the prior art that applying a stabilizing composition containing an ultraviolet radiation absorber and a nonaggressive liquid carrier on a hot but unmolten polycarbonate resin would result only in volatilization of the carrier and/or the stabilizer and no surface interaction between the absorber and the polycarbonate.

The present process does not deleteriously affect the advantageous physical properties of the polycarbonate resin. When the non-opaque films of the foregoing examples were treated according to the process of the instant invention the optical properties of these films were not altered by the treatment.

In the practice of the present invention the liquid carrier must not only be nonaggressive towards the polycarbonate, but should also wet the polycarbonate. Thus, for example, while water is nonaggressive towards polycarbonate it is not an effective liquid carrier for the purposes of the present invention because it does not wet the polycarbonate.

The foregoing disclosure of this invention is not to be considered as limiting, since many variations may be made by those skilled in the art without departing from the scope or spirit of the foregoing description.

What we claim as new and desire to secure by Letters Patent of the United States is:

1. A process for producing a polycarbonate resin article having an improved resistance to degradation by ultraviolet radiation comprising impregnating the surface layers of said polycarbonate resin article with at least one ultraviolet radiation absorber by first preheating said article and thereafter contacting the surface of said preheated article with an ultraviolet radiation stabilizing composition consisting essentially of (i) at least one ultraviolet radiation absorber, and (ii) at least one liquid carrier which is nonaggressive towards and wets polycarbonate resin selected from the class consisting of alcohols, hydroxy ethers, alcohol-water mixtures, liquid aliphatic hydrocarbons, liquid cycloaliphatic hydrocarbons, and chlorofluorocarbons; said polycarbonate resin article having been preheated before being contacted with said stabilizing composition to a temperature sufficient for said ultraviolet radiation absorber to effectively impregnate the surface layers of said polycarbonate resin article when said surface of said article is in contact with said stabilizing composition but insufficient to deleteriously affect the properties of said polycarbonate resin.

2. The process of claim 1 wherein said polycarbonate article is preheated to a temperature of between about 65 and about 149 degrees C. before the stabilizing composition is contacted with the surface thereof.

3. The process of claim 2 wherein said polycarbonate article is preheated to a temperature of between about 75 and about 135 degrees C. before the stabilizing composition is contacted with the surface thereof.

4. The process of claim 3 wherein said ultraviolet radiation absorber is selected from the class consisting of benzophenone, derivatives of benzophenone, benzotriazole, derivatives of benzotriazole, cyanoacrylates, and benzylidene malonates.

5. The process of claim 4 wherein said cyanoacrylates are compounds represented by the general formula

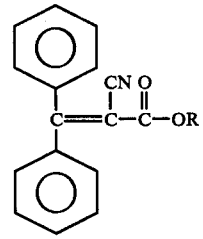

wherein R represents an alkyl or hydroxyalkyl radical.

6. The process of claim 4 wherein said stabilizing composition contains an amount of ultraviolet radiation absorber sufficient to diffuse into the surface layers of said polycarbonate in concentrations effective to protect said polycarbonate against degradation by ultraviolet radiation.

7. The process of claim 6 wherein said stabilizing composition contains from about 0.01 to about 15 weight percent of ultraviolet radiation absorber.

8. The process of claim 7 wherein said stabilizing composition contains from about 0.1 to about 10 weight percent of ultraviolet radiation absorber.

9. The process of claim 8 wherein said stabilizing composition is at room temperature when it is applied onto the surface of said preheated polycarbonate article.

* * * * *